United States Patent [19]

Jardin

[11] 4,436,338
[45] Mar. 13, 1984

[54] OPERATING MECHANISM FOR A TILTABLE SLIDING COVER

[75] Inventor: Hans Jardin, Inning, Fed. Rep. of Germany

[73] Assignee: Webasto-Werk W. Baier GmbH & Co., Munich, Fed. Rep. of Germany

[21] Appl. No.: 349,530

[22] Filed: Feb. 17, 1982

[51] Int. Cl.³ .............................................. B60J 7/04
[52] U.S. Cl. .................................................... 296/223
[58] Field of Search ........................ 296/223, 221, 222

[56] References Cited

U.S. PATENT DOCUMENTS

| | | | |
|---|---|---|---|
| 2,973,991 | 3/1961 | Werner | 296/223 |
| 3,414,319 | 12/1968 | Lecomte et al. | 296/223 |
| 4,272,125 | 6/1981 | Bienert et al. | 296/223 |

FOREIGN PATENT DOCUMENTS

| | | | |
|---|---|---|---|
| 2508106 | 9/1975 | Fed. Rep. of Germany | 296/223 |
| 56-154322 | 11/1981 | Japan | 296/223 |

*Primary Examiner*—Robert R. Song
*Attorney, Agent, or Firm*—Antonelli, Terry & Wands

[57] ABSTRACT

An operating mechanism for a tiltable sliding cover of a roof of a motor vehicle having an electric motor by means of which the sliding cover can be operated by a transmission, at least one threaded cable and a cover-adjusting unit connected with the threaded cable. Also part of the operating mechanism is a switching arrangement that is in operating connection with the cover-adjusting unit and is rendered operative as a function of the position of the cover-adjusting unit, with said switching arrangement having the purpose of permitting the switching off of the current supply to the electric motor in the position of the cover-adjusting unit that corresponds to the closed position of the sliding cover. A clutch is arranged between the cover-adjusting unit and the switching arrangement, said clutch having the purpose of permitting the interruption of the operating connection between the cover-adjusting unit and the switching arrangement.

12 Claims, 15 Drawing Figures

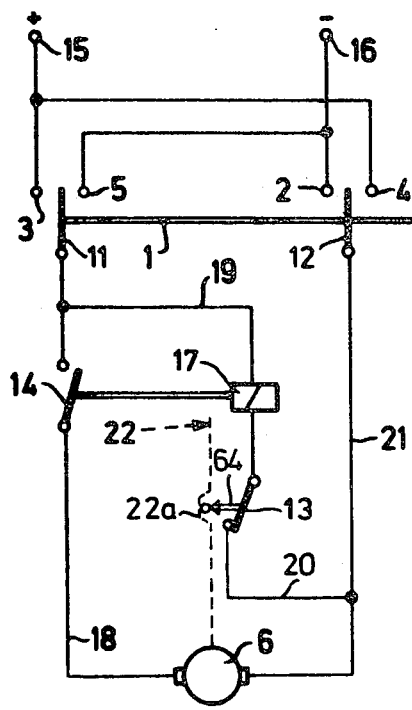
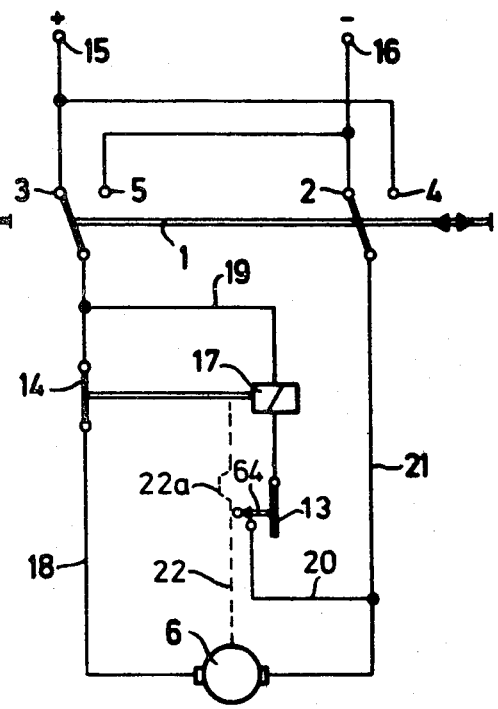
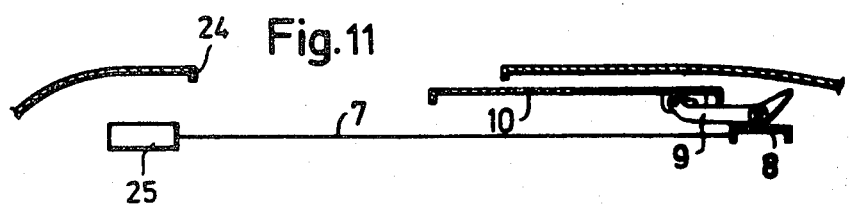
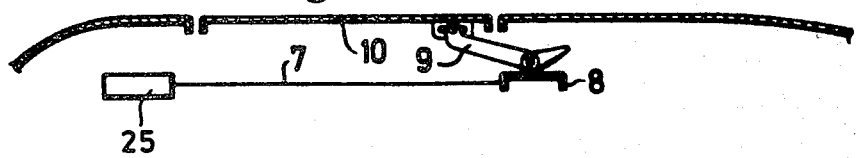
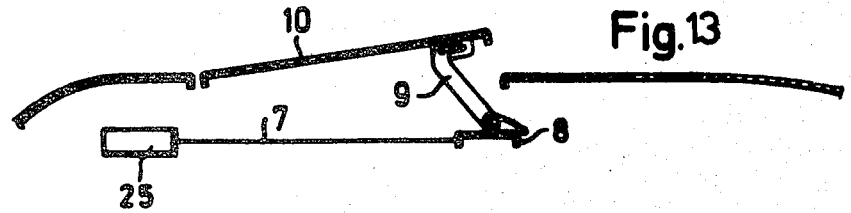

OPERATING MECHANISM FOR A TILTABLE SLIDING COVER

BACKGROUND AND SUMMARY OF THE INVENTION

The invention concerns an operating mechanism for a tiltable sliding cover of a roof of a motor vehicle having an electric motor by means of which the sliding cover can be operated by a transmission, at least one threaded cable and a cover-adjusting unit connected with the threaded cable and having a switching arrangement that is in operating connection with the cover-adjusting unit and is rendered operative as a function of the position of the cover-adjusting unit, with said switching arrangement having the purpose of switching off the current supply to the electric motor in the position of the cover-adjusting unit that corresponds to the closed position of the sliding cover.

An operating mechanism of this type was described in commonly-assigned U.S. Pat. application Ser. No. 291,055, filed Aug. 7, 1981. For a perfect functioning of such a mechanism, it is important that the response of the switching arrangement be synchronized precisely with the adjusting movement of the sliding cover so that the cover, starting from a pushed-back position or a tilted-out position, is arrested precisely in the closed position. Because of the unavoidable tolerances, this synchronization must be carried out for each individual motor vehicle. In the case of the previous patent application mentioned above, this was achieved by the fact that, first the cover-adjusting unit and the cover are installed in the motor vehicle and are manually pushed into a predetermined position before the unit, consisting of the electric motor, the transmission and the switching arrangement, is brought into operating connection with the cover-adjusting unit when the switching arrangement is in a specified position.

The present invention has, as an object, the creation of an operating mechanism that can be installed more rapidly and more easily.

Using an operating mechanism of the initially mentioned type as a starting point, the noted object of the invention is achieved, in accordance with a preferred embodiment, by providing, between the cover-adjusting unit and the switching arrangement, a clutch by means of which the operating connection between the cover-adjusting unit and the switching arrangement can be interrupted.

The development according to the present invention makes it possible to install the cover-adjusting unit with the threaded cable or cables and the motor with the transmission, as well as the switching arrangement, being in the predetermined position, when the clutch is disengaged. The cover-adjusting unit may then, if desired, together with the sliding cover, by means of the motor, be brought into a predetermined position, expediently into the fully tilted position. As soon as the cover-adjusting unit takes up this predetermined position, the clutch is engaged in order to establish the operating connection between the cover-adjusting unit and the switching arrangement that is adjusted to this predetermined position. Said construction significantly simplifies the installation. The operational parts required for the adjustment of the cover can be largely premounted and preadjusted before they are installed into the motor vehicle at the production line and can be coupled with one another by a few simple manipulations in a precisely synchronized manner.

In order to avoid an accidental shifting of the adjusted switching arrangement when the clutch is disengaged, a blocking means is provided, as a further aspect of the invention, for blocking the switching arrangement when the operating connection, between the cover-adjusting unit and the switching arrangement, is interrupted by means of the clutch. For the purpose of an especially simple construction, the clutch and the blocking means may expediently be combined into one structural unit.

The operating drive of the switching arrangement is preferably transmitted by the threaded cable by means of a pinion, which, together with the threaded cable, forms the clutch. This pinion is expediently mounted on a pinion shaft which can be moved axially between a first axial position, in which the pinion is disengaged from the threaded cable, and a second axial position, in which the pinion is engaged with the threaded cable. In this manner, structural elements are used for the clutch which cause no significant additional expenses. In this case, a shape-keyed mating element can be provided as the blocking means which sits on the pinion shaft and which, when the pinion shaft is in the first axial position and in the predetermined angular position, is in mating connection with an opposing element attached to the housing, and which, in the second axial position of the pinion shaft, is disengaged from the opposing element. In this manner, the blocking means also can be constructed simply, reliably and cost-effectively.

The switching arrangement expediently has a step-by-step gear-shift consisting of a ratchet wheel that is connected with the pinion shaft in a manner fixed against relative rotation in both axial positions, and a stop wheel by means of which a contact arm of a limit switch can be activated that controls the current supply to the electric motor.

The mating element of the pinion shaft expediently consists simply of one or several adjacent teeth, and the opposing element in such a case is an internal toothing that is attached to the housing, with the internal toothing extending over a larger curvature area than the mating element of the pinion shaft. In order to be able to easily adjust the pinion shaft, the pinion shaft, preferably on one of its front sides, has a radial slot into which an appropriate tool, for example, a screwdriver, can be inserted. In this case, preferably a part of the housing that houses the pinion shaft, in the area of the slotted end of the pinion shaft, has one or more radial slots aligned with the axis of the pinion shaft. In combination with the radial slot of the pinion shaft, these radial slots may be used as markings for adjusting purposes.

These and further objects, features and advantages of the present invention will become more obvious from the following description when taken in connection with the accompanying drawings which show, for purposes of illustration only, a single embodiment in accordance with the present invention.

BRIEF DESCRIPTION OF THE DRAWINGS

FIG. 9 is a basic circuit diagram of the operating mechanism for the switching position that corresponds to the closed position of the sliding cover;

FIG. 10 is a basic circuit diagram of FIG. 9 in a switching position that corresponds to a pushed-back intermediate position of the sliding cover;

FIG. 11 is a diagrammatic representation of the roof of the motor vehicle with the sliding cover in a pushed-back condition;

FIG. 12 shows the roof of FIG. 11 with the sliding cover in a closed condition; and FIG. 13 shows the roof of FIG. 11 with the sliding cover tilted out.

DETAILED DESCRIPTION OF THE PREFERRED EMBODIMENT

Figure 1:
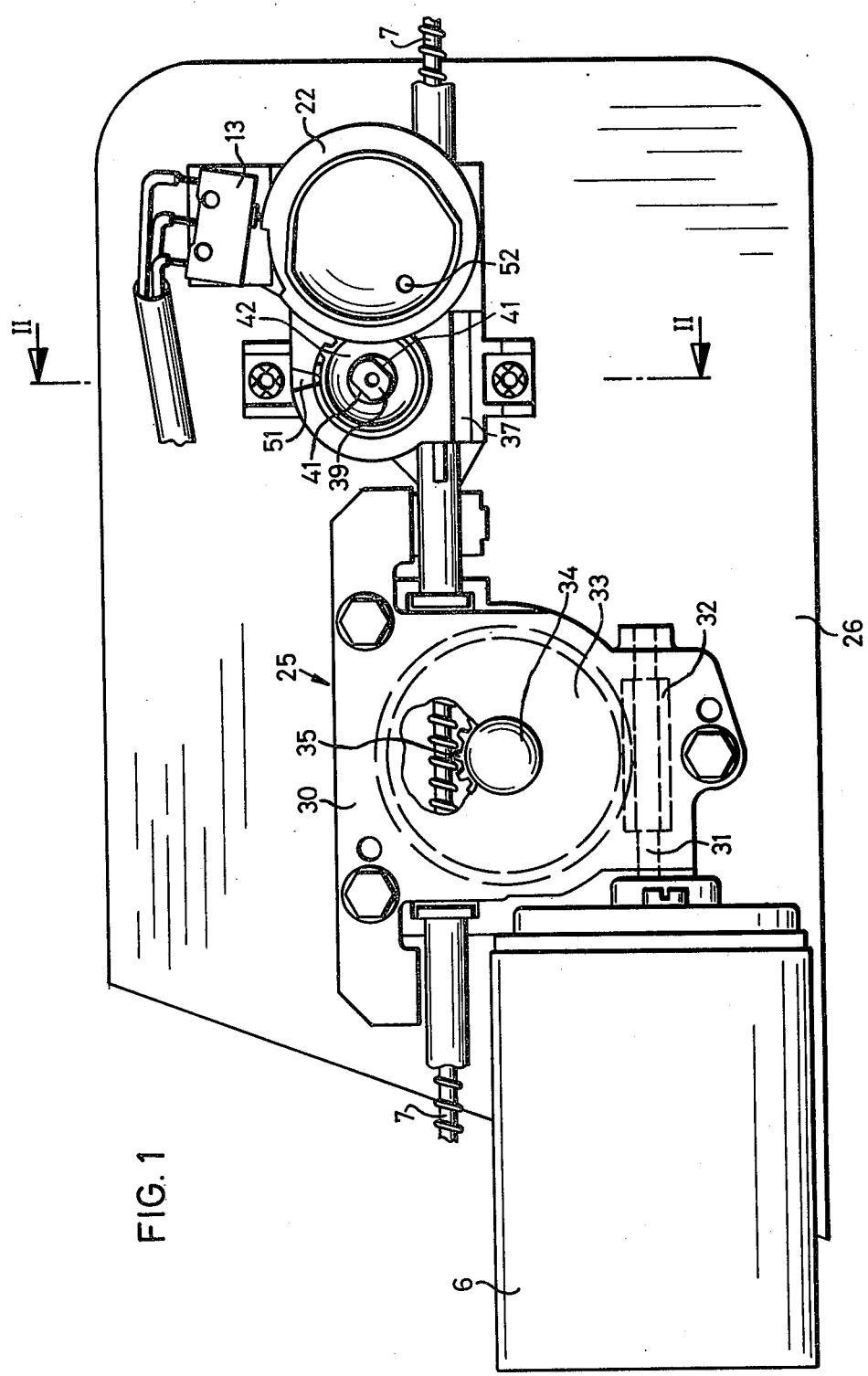
FIG. 1 shows a plan view of an arrangement of an operating mechanism for a tiltable sliding cover that includes the electric motor, the transmission, the switching arrangement and the clutch.

According to the basic circuit diagram n FIGS. 9 and 10, a manually-operated pole reversal switch 1, which is automatically set back to the zero position of FIG. 9 by a spring means that is not shown, can be switched against the contacts 2, 3, on the one hand, and against the contacts 4, 5, on the other hand. Contacts 3 and 4 are connected with the positive pole 15, and contacts 2 and 5 with the negative pole 16 of the vehicle battery. Contact arms 11, 12 of the pole reversal switch 1, through a first and/or second junction line 18, 21, are connected with the terminals of an electric motor 6. According to the switching position of the pole reversal switch 1, the electric motor can, therefore, be operated in one or the other direction of rotation. In this manner, the sliding cover 10, shown in FIGS. 11 and 13, is either tilted upward (FIG. 13) from an opening 24 in the roof, or is pushed under the fixed roof panel (FIG. 11) by means of a transmission 25 connected with the motor 6, at least one pressure-resistant cable 7, as well as a transport bridge 8 and a lever part 9 (which diagrammatically represent the cover-adjusting unit). A switch 14 is located in the junction line 18 which is activated by an impulse relay 17. The control winding of the relay 17 is, on the one hand, connected with the junction line 18 between the switch 14 and the contact arm 11 by means of a first connection 19 and, on the other hand, with the junction line 21, by means of a second connection 20. A microswitch 13 is located in the connection 20 which is activated by a trip gear, shown diagrammatically at 22. The trip gear 22 is driven by the motor 6 and has a negative cam 22a which, in the closed state of the sliding cover 10 (FIG. 12), interacts with the microswitch 13 in such a way that there is a connection between the impulse relay 17 and the junction line 21 (FIG. 9).

Figure 8A:
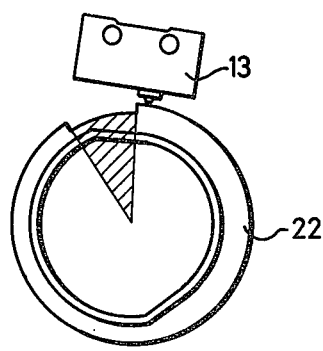
FIGS. 8(a), 8(b) and 8(c) show a part of the switching arrangement of the arrangement according to FIG. 1 in three different operational states.
Figure 8B:
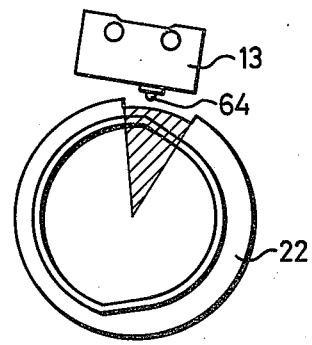
Figure 8C:
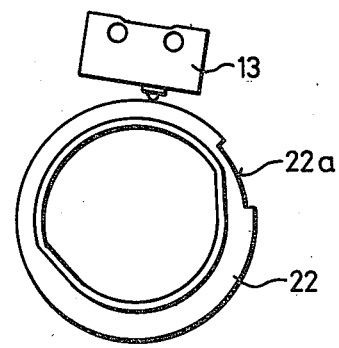

When the pole reversal switch 1 is switched against the contacts 2 and 3 (FIG. 10), the impulse relay 17 receives current, first by means of the microswitch 13 that is still in the position according to FIG. 9, so that it closes the switch 14 and connects the electric motor 6 with the poles 15, 16. As a result, the motor 6 drives the transmission 25 and the cable 7 so as to cause the sliding cover 10 to be pushed back from the closed position according to FIG. 12 into the open position of FIG. 11. At the same time, the trip gear 22 is shifted in such a way (corresponding to a transition from the operational position according to FIG. 8b to the position according to FIG. 8c) that the microswitch 13 opens. If the pole reversal switch 1 remains activated, the sliding cover 10 is pulled back until it reaches its end position. In order to close the sliding cover 10 again, the pole reversal switch 1 is reversed, so that the rotating direction of the motor 6 is reversed. In the closed position of the cover 10, the negative cam 22a brings the contact arm 64 of the microswitch 13 into the position shown in FIG. 9. The impulse relay 17 is excited and opens the switch 14, so that the motor 6 becomes currentless. When the pole reversal switch 1 is switched to the contacts 4, 5, the impulse relay 17 responds again, and the switch 14 closes. The motor 6 is driven in a rotating direction, which causes the sliding cover 10 to be tilted out, as shown in FIG. 13, until the trip gear 13 turns into the position according to FIG. 8a and the switch 13 opens.

As FIG. 1 shows, the motor 6 sits on a motor support 26 which also carries the transmission 25. The transmission 25 has a gear housing 30 into which the motor shaft 31 projects. The motor shaft 31 carries a worm gear 32 which mates with a worm wheel 33, which is located on a shaft 24, which is housed in the gear housing 30 in a freely-rotatable manner. The shaft 34 also carries a pinion 35 which is in mating engagement with the cable 7 that is resistant to pressure.

Figure 2:
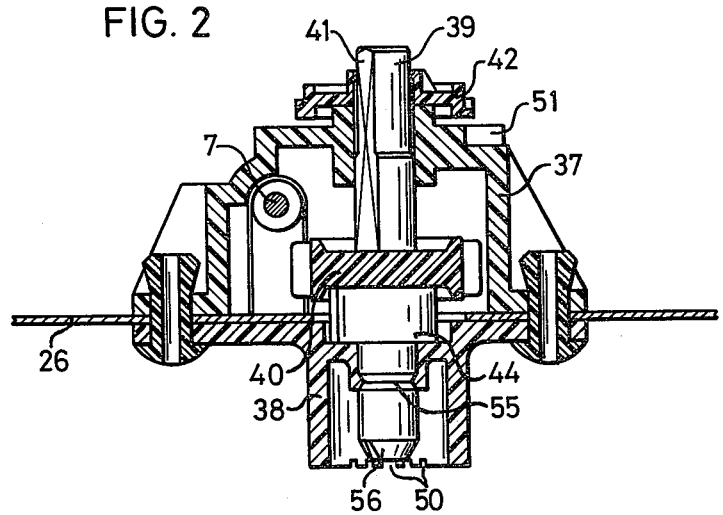
FIG. 2 shows a section through the clutch of the arrangement according to FIG. 1, along Line II—II, in a disengaged condition, with the pinion shaft left in elevational form.
Figure 3:
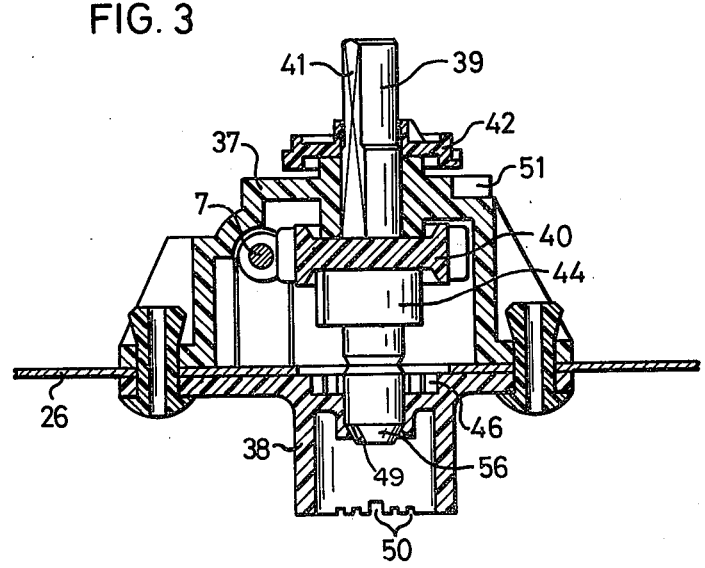
FIG. 3 shows a section according to FIG. 2 in the engaged state of the clutch.

A clutch housing 37 and an opposed bearing 38 are also mounted on the motor support 26. In the clutch housing 37 and the opposed bearing 38, a pinion shaft 39 is located so that it can be rotated and axially shifted by a limited amount. On the pinion shaft 39, a shifting pinion 40 is mounted which, by an axial adjustment of the pinion shaft 39, can optionally be disengaged (FIG. 2) or brought into mating engagement (FIG. 3) with the cable 7. The pinion shaft 39 has flat areas 41 of which only one can be recognized in FIGS. 2 and 3, both being visible in FIG. 1. A ratchet wheel 42 is mounted (slipped on) on the pinion shaft 39, with the ratchet wheel 42 having a center opening with flat areas that match the flat areas 41. The flat areas 41 of the pinion shaft 39 and the complementing flat areas of the center opening of the ratchet wheel 42 ensure that the pinion shaft 39 and the ratchet wheel 42 are firmly fixed for rotating together, while the pinion shaft can be axially adjusted with respect to the ratchet wheel (FIGS. 2 and 3). The ratchet wheel 42 and the trip gear 22 jointly form a step-by-step gear-shift, the gear ratio of which is regulated in such a way that the trip gear 22, during a movement of the sliding cover 10 from its fully pushed-back position, past the closed position, to its fully tilted-out position, covers a route of not more than 360°. Such a step-by-step gear-shift in itself is known, for example, from DE-GM 76 29 034. Preferably, the step-by-step gear-shift is, in the manner explained in the previously-noted U.S. Pat. application Ser. No. 291,055, designed in such a way that the shifting step carried out by the trip gear 22 in the area of the closed position of the sliding cover 10 is extended and/or the angular velocity of the trip gear 22, during said shifting step, is decreased.

Figure 5:
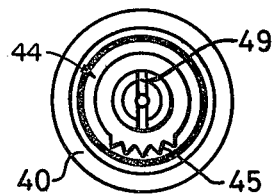
FIG. 5 shows a front view of the pinion and the pinion shaft in the direction of arrow V of FIG. 4.

A shape-keyed mating element 44 is also located on the pinion shaft 39, and has five adjacent teeth 45 (FIG. 5). When the pinion shaft 39, with the clutch being disengaged, takes up the position shown in FIG. 2, the shape-keyed mating element 44 engages with an opposing element 46 in the form of an internal toothing 47 in the opposed bearing 38. The internal toothing 47, which, in the shown embodiment, has ten teeth, extends over a larger curvature area than the teeth 45 forming the shape-keyed mating element 44. This permits an engagement between the shape-keyed mating element 44 and the opposing element 46 in one of several different relatively rotated positions of the pinion shaft 39.

Figure 4:
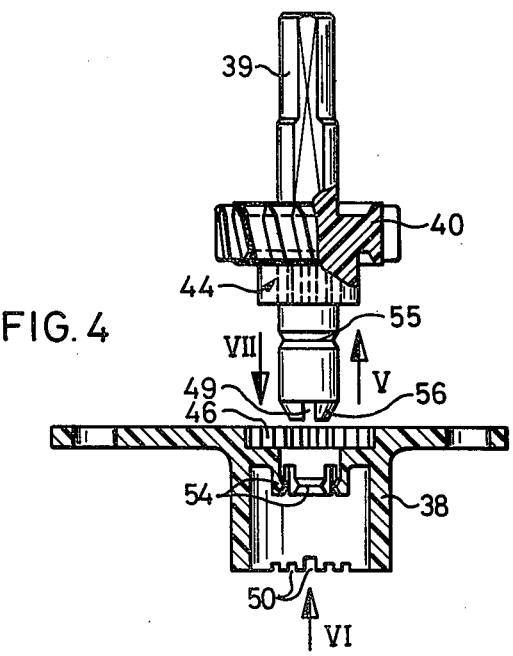
FIG. 4 is an exploded, partial sectional, view of the pinion, the pinion shaft and an opposed bearing forming a part of the blocking means, where the pinion shaft is shown in an anuglar position that is different from that shown in FIGS. 1 to 3.
Figure 7:
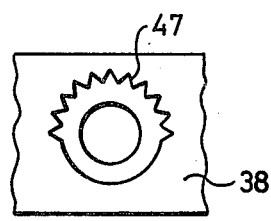
FIG. 7 shows a partial plan view of the opposed bearing in the direction of the arrow VII of FIG. 4.
Figure 6:
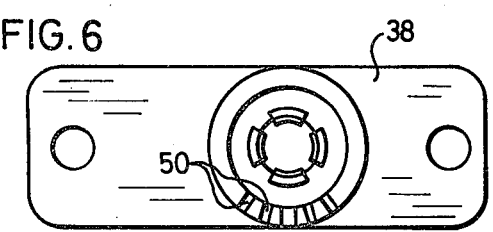
FIG. 6 shows a plan view of the opposed bearing in the direction of arrow VI of FIG. 4.

On one of its front sides, in FIGS. 1 to 4, on its lower front side, the pinion shaft 39 has a radial slot 49. The opposing bearing 38, in the area of the slotted end of the pinion shaft, has several radial slots 50 that are aligned with the axis of the pinion shaft 39, which may be used to visually determine the angular position of adjustment of the slot 49 in shaft 39. In FIGS. 3 and 4, the centermost of the five slots 50 is shown as being deeper and wider than the others. This is not an essential feature, but is advantageous in that it enables easy recognition of the center of the range of adjustment.

The electric motor 6, the transmission 25, as well as the switching arrangement consisting of the step-by-step gear-shift (parts 22, 42) and the microswitch 13 may, according to FIG. 1, be expediently combined into a preassembled and adjusted assembly unit which can be installed into the motor vehicle as a whole, while the pinion shaft 39 is in the position shown in FIG. 2. In this position, the clutch, consisting of the shifting pinion 40 and the threaded cable 7, is disengaged while the blocking means with the shape-keyed mating element 44 and the opposing element 46 holds the pinion shaft 39 in the preadjusted angular position. This angular position of the pinion shaft 39 corresponds to a preadjusted position of the switching arrangement (gear wheel 42, trip gear 22, microswitch 13), which itself is assigned to a specified position, in this case, to the fully tilted-out position of the sliding cover 10. Use of the radial slots 50 and the radial tool reception slot 49 facilitates the preadjustment of the angular position of the pinion shaft 39 and the gear wheel 42 with respect to the opposing bearing 38 and/or the clutch housing 37. For this purpose, a slot 51 may also be provided on the outside of the clutch housing 37 by means of which one of the teeth or one of the gaps of the teeth of the gear wheel 42 can be aligned. In this regard, it should be appreciated that, for carrying out this preadjustment, it is necessary to displace shaft 39 upwardly from its FIG. 2 position at least until teeth 45 no longer mesh with teeth 47. For this reason, sufficient clearance must be left between the engaged and disengaged positions. Additionally, despite such upward shifting (which may be achieved by upward pressure applied to the tool in slot 49) slots 50 still enable a visual determination of the position of angular adjustment. As an adjusting aid for the trip gear 22, a boring 52 can be provided in this wheel, which may, for example, be aligned with a blind hole underneath (not shown) in the clutch housing 37. The blocking means 44, 46 prevent an unintended disadjustment of the switching arrangement.

The cover-adjusting unit, diagrammatically shown by the transport bridge 8 and the lever part 9, may be produced as another preassembled and adjusted assembly unit which is brought into operating connection with the assembly unit of FIG. 1, placed on the motor support 26, by means of the threaded cable 7. Afterward, the sliding cover 10, by turning on the motor 6, can then be moved into the predetermined position, in this case, therefore, into the fully tilted-out position according to FIG. 13. As soon as the sliding cover 10 has reached said position, the pinion shaft 39 is brought from the position of FIG. 2 into the position of FIG. 3. This can be achieved by manual pressure applied, for example, by a thumb or a tool inserted in slot 49, and releases the blocking means 44, 46. At the same time, the clutch 7, 40 is engaged. In this simple manner, the cover-adjustment is synchronized with the adjustment of the switching arrangement 13, 22, 42.

In a correspondingly simple manner, repair or maintenance work may also be carried out later. For this purpose, the sliding cover 10 must only be brought back into the predetermined position (which, in the present embodiment, is the fully tilted-out position according to FIG. 13), whereupon the pinion shaft 39 is axially moved from the position of FIG. 3 to the position of FIG. 2, such as by manual pressure applied to the upper end of shaft 39. Now the cover, the cover-adjusting unit or other operational parts can be removed or exchanged. In order to subsequently reestablish the synchronization between the movement of the switching arrangement 13, 22, 42 and the movement of the cover, the blocking means 44, 46 must be released again, and the clutch 7, 40 engaged, after the sliding cover 10 is moved into the fully tilted-out position.

The opposing bearing 38 has flexible projections 54 which, when the clutch 7, 40 is disengaged, are placed in an annular V-slot 55 in the pinion shaft 39, and, when the clutch is engaged, are placed against a bevel 56 at what is the lower end of the pinion shaft 39 in the two concerned axial positions. A shifting of the pinion shaft 39 from one of these two positions is only possible by overcoming the spring force exercised by the projections 54.

While I have shown and described a single embodiment in accordance with the present invention, it is understood that the same is not limited thereto, but is susceptible of numerous changes and modifications as known to those skilled in the art, and I, therefore, do not wish to be limited to the details shown and described herein, but intend to cover all such changes and modifications as are encompassed by the scope of the appended claims.

I claim:

1. An operating mechanism for a tiltable sliding cover of a roof of a motor vehicle having an electric motor by means of which the sliding cover can be operated via a transmission, at least one threaded cable and a cover-adjusting unit connected with the threaded cable, and having a switching arrangement that is in operating connection with the cover-adjusting unit and is rendered operative as a function of the position of the cover-adjusting unit, said switching arrangement switching off current supply to the electric motor in a position of the cover-adjusting unit that corresponds to a closed position of the sliding cover, wherein, between the cover-adjusting unit and the switching arrangement, a clutch means is provided for interrupting the operating connection between the cover-adjusting unit and the switching arrangement.

2. An operating mechanism according to claim 1, wherein the operating drive of the switching arrangement is transmitted by the threaded cable by means of a shifting pinion which, together with the threaded cable, comprises the clutch.

3. An operating mechanism according to claim 2, wherein the shifting pinion is mounted on an axially-movable pinion shaft, said pinion shaft being mounted for movement between a first axial position, in which the shifting pinion is disengaged from the threaded cable, and a second axial position, in which the shifting pinion is engaged with the threaded cable.

4. An operating mechanism according to claim 3, wherein a blocking means is provided which comprises a shape-keyed mating element located on the pinion shaft which, when the pinion shaft is in the first axial position and is in a predetermined angular position, is in mating connection with an opposing element attached to a housing for the clutch means and which, in the second axial position of the pinion shaft, is disengaged from the opposing element.

5. An operating mechanism according to claim 4, wherein the mating element on the pinion shaft comprises at least one tooth, and the opposing element comprises internal teeth attached to said housing, said internal teeth extending over a larger curvature area than the at least one tooth on the pinion shaft.

6. An operating mechanism according to claim 5, wherein the pinion shaft is provided with a radial slot at one end.

7. An operating mechanism according to claim 6, wherein, in a part of the housing, in an area of the end of the pinion shaft having said slot, at least one radial slot aligned with the longitudinal axis of the pinion shaft is provided.

8. An operating mechanism according to claim 3 or 4 or 5 or 6 or 7, wherein the switching arrangement comprises a step-by-step gear-shift, including a gear wheel that is in both of said axial positions, connected with the pinion shaft in a manner precluding relative rotation therebetween, and a trip gear for controlling activation of the contact arm of a limit switch that controls the current supply to the electric motor.

9. An operating mechanism according to claim 8, wherein spring catches for the releasable arresting of movement of the pinion shaft in both of said axial positions are provided.

10. An operating mechanism according to claim 3 or 4 or 5 or 6 or 7, wherein spring catches for the releasable arresting of movement of the pinion shaft in both of said axial positions are provided.

11. An operating mechanism according to claim 1 or 2, comprising a blocking means for blocking movement of the switching arrangement when the operating connection between the cover-adjusting unit and the switching arrangement is interrupted by means of the clutch means.

12. An operating mechanism according to claim 11, wherein the clutch means and the blocking means are combined into one structural unit.

* * * * *